United States Patent
Zhu et al.

(10) Patent No.: US 11,283,606 B2
(45) Date of Patent: Mar. 22, 2022

(54) TRUSTED EXECUTION ENVIRONMENT-BASED KEY BURNING SYSTEM AND METHOD

(71) Applicant: AMLOGIC (SHANGHAI) CO., LTD., Shanghai (CN)

(72) Inventors: Pengguang Zhu, Shanghai (CN); Peifu Jiang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 114 days.

(21) Appl. No.: 16/343,557

(22) PCT Filed: Oct. 31, 2018

(86) PCT No.: PCT/CN2018/113145
§ 371 (c)(1),
(2) Date: Apr. 19, 2019

(87) PCT Pub. No.: WO2019/114451
PCT Pub. Date: Jun. 20, 2019

(65) Prior Publication Data
US 2021/0367776 A1    Nov. 25, 2021

(30) Foreign Application Priority Data
Dec. 14, 2017   (CN) .......................... 201711340481.0

(51) Int. Cl.
*H04L 9/08* (2006.01)

(52) U.S. Cl.
CPC .......... *H04L 9/0877* (2013.01); *H04L 9/0897* (2013.01)

(58) Field of Classification Search
CPC ..... H04L 9/0877; H04L 9/0897; H04L 9/083; H04L 9/0822; G06F 21/57; G06F 21/74; G06F 21/602
(Continued)

(56) References Cited

U.S. PATENT DOCUMENTS

2002/0041684 A1* 4/2002 Nishioka ............... H04L 9/3013
                                                                380/30
2009/0313705 A1* 12/2009 Adams .................... H04L 51/38
                                                                726/30
(Continued)

FOREIGN PATENT DOCUMENTS

| CN | 106453196 A | 2/2017 |
| CN | 106709360 A | 5/2017 |
| WO | 2012074720 A1 | 6/2012 |

*Primary Examiner* — Sanchit K Sarker
(74) *Attorney, Agent, or Firm* — Benesch, Friedlander, Coplan & Aronoff LLP

(57) ABSTRACT

The present disclosure provides a trusted execution environment-based key burning system. After a terminal device is enabled, a normal operating system is started, the normal operating system acquires key data to be burned and outputs a switching signal and the key data to be burned, a microprocessor receives the switching signal in a monitor mode and the microprocessor is switched to the secure operating system from the normal operating system, the secure operating system receives the key data to be burned and decrypts the data to be burned according to preset key data, to acquire and write the corresponding original key data into a secure storage area of the secure operating system. Due to the use of the trusted execution environment-based key burning, the key is burned, stored and used safely. In addition, the cryptography protects the key from unexpected damage in transmission and keeps the key integral.

9 Claims, 2 Drawing Sheets

(58) Field of Classification Search
USPC .......................................................... 380/44
See application file for complete search history.

(56) References Cited

U.S. PATENT DOCUMENTS

| | | | |
|---|---|---|---|
| 2014/0123320 A1* | 5/2014 | Isozaki | G06F 21/44 726/29 |
| 2014/0245013 A1* | 8/2014 | Kim | H04L 63/10 713/171 |
| 2016/0173276 A1* | 6/2016 | Minematsu | G09C 1/00 380/28 |
| 2017/0091458 A1* | 3/2017 | Gupta | G06F 21/57 |
| 2018/0032733 A1* | 2/2018 | Surdu | G06F 9/4881 |
| 2021/0359861 A1* | 11/2021 | Chen | H04L 9/3247 |

* cited by examiner

TRUSTED EXECUTION ENVIRONMENT-BASED KEY BURNING SYSTEM AND METHOD

CROSS-REFERENCE TO RELATED APPLICATIONS

The present application claims priority to and is a national phase of Ser. No. PCT/CN2018/113145 filed Oct. 31, 2018, which claims priority to and the benefit of Chinese Patent Application No. 201711340481.0 filed Dec. 14, 2017, the entire contents of each of these applications are incorporated herein by reference.

FIELD OF THE INVENTION

The present disclosure to the technical field of data security, and more particularly, to a trusted execution environment-based key burning system and a method thereof.

BACKGROUND

With the popularity of intelligent devices, such as set-top boxes and mobile phones, online payment and Digital rights management (DRM) and other applications are widely used in various industries. Accordingly, large quantities of keys need to be preset in the terminals, so as to ensure the safety of data in the above-mentioned applications. Terminal manufacturers provide burning processes and keys by a burning method at the factory, and preset the keys in the terminals. Application vendors obtained the keys online and burn the keys into the terminals.

However, many problems listed as follows exist in the existing burning method. The burning method at the factory provided by the terminal manufacturer is prone to make artificial leak happens, and keys may be easily decrypted and leaked when burning in a rich execution environment (REE) by the terminal manufacturer and the application vendor. Once the key is leaked, data security in the applications may be under threat.

SUMMARY

In order to solve the foregoing problems in the prior art, the present disclosure provides a trusted execution environment-based key burning system and a method thereof.

In one embodiment, a trusted execution environment-based key burning system includes a background device and a terminal device, wherein the background device is configured to encrypt original key data so as to acquire key data to be burned and output the key data to be burned, wherein the terminal device is provided with a microprocessor based on Trust Zone technology. The microprocessor has a physical core divided into a virtual secure core and a virtual normal core, and the microprocessor provides a trusted execution environment which provides a secure operating system based on the secure core, and a rich execution environment which provides a normal operating system based on the normal core. The microprocessor switches between the secure operating system and the normal operating system based on monitor mode of the microprocessor. After the terminal device is enabled, the normal operating system is started, a client application preset by the terminal device receives the key data to be burned and sends a request to the normal operating system. The normal operating system outputs a switching signal and the key data to be burned. The microprocessor receives the switching signal in a monitor mode and is switched to the secure operating system from the normal operating system. The secure operating system receives the key data to be burned and decrypts the data to be burned according to preset key data. If a decryption operation is successfully completed, the secure operating system will acquire the corresponding original key data and write the original key data into a secure storage area of the secure operating system, and will output a prompt message informing a user of a unsuccessful decryption if the decryption operation fails.

The background device may be a specific hardware security module or a general-purpose computer in which information security can be ensured. The background device includes a storage module, configured to store the original key data, the key data preset by the terminal device and the key data to be burned and generated from the background device also includes an encryption module, configured to encrypt the original key data using the key data preset by the terminal device so as to acquire the key data to be burned, and configured to output the key data to be burned. The normal operating system may include a client application module, configured to receive the key data to be burned, configured to output the switching signal and the key data to be burned.

The hardware module may include a monitor mode module, configured to receive the switching signal and switch the microprocessor between the normal operating system and the secure operating system. The secure operating system may include a trusted application module, configured to receive the key data to be burned and acquire preset key data, and configured to decrypt the key data to be burned using the preset key data, and configured to acquire the corresponding original key data and write the original key data into the secure storage area of the secure operating system if a decryption operation is successfully completed, and output a prompt message informing a user of a unsuccessful decryption if the decryption operation fails. After the decryption operation is successfully completed, the trusted application module writes the original key data into the secure storage area by calling a file system interface of the secure operating system.

In another embodiment, a trusted execution environment-based key burning method adopting the above-mentioned trusted execution environment-based key burning system, wherein the method includes Step S1, encrypting the original key data preset by the terminal device so as to acquire the key data to be burned and output the key data to be burned by the background device. The method includes Step S2, after the terminal device is enabled, starting the normal operating system and receiving the key data to be burned by the client application. The method includes Step S3, after the normal operating system is started, acquiring the key data to be burned, and outputting the switching signal and the key data to be burned. The method includes Step S4, receiving the switching signal by the microprocessor and switching the microprocessor to the secure operating system. The method includes Step S5, after the secure operating system is started, receiving the key data to be burned and decrypting the data to be burned according to preset key data through a decryption operation, and determining whether the decryption operation is successfully completed by the secure operating system. The method includes if the result shows "YES", proceeding to Step S6; if the result shows "NO", proceeding to Step S7. Step S6 includes after the decryption operation is successfully completed, acquiring the corresponding original key data and writing the original key data into the secure storage area by the secure operating system.

Step S7 includes outputting a prompt message informing the user of an unsuccessful decryption by the secure operating system if the decryption operation fails.

In Step S3, the normal operating system receives the key data to be burned via the client application module, and outputs the switching signal and the key data to be burned. In Step S4, the microprocessor receives the switching signal via the monitor mode module, and starts the monitor mode to enable the secure operating system. In Steps S5, S6 and S7, the secure operating system receives the key data to be burned via the trusted application module, and decrypts the key data to be burned according to the preset key data, and acquires the corresponding original key data after the decryption operation is successfully completed, and writes the original key data into the secure storage area of the secure operating system, and outputs a prompt message informing the user of an unsuccessful decryption if the decryption operation fails.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
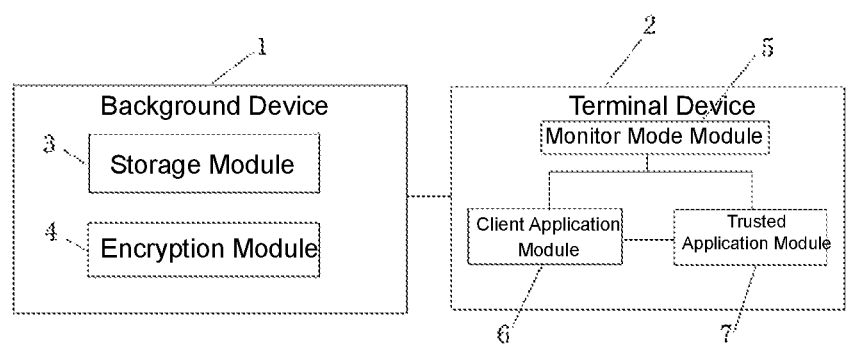
FIG. 1 is a schematic diagram of functional modules of a trusted execution environment-based key burning system in an embodiment of the present disclosure.

The present disclosure will now be described more fully hereinafter with reference to the accompanying drawings, in which exemplary embodiments of the invention are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one. Hereinafter, certain exemplary embodiments according to the present disclosure will be described with reference to the accompanying drawings.

The present disclosure may have the following beneficial effects. Due to the use of the trusted execution environment-based key burning, the key is burned, stored and used safely. In addition, the cryptography protects the key from unexpected damage in transmission and keeps the key integral.

As shown in FIG. 1, a trusted execution environment-based key burning system, comprising a background device 1 and a terminal device 2, wherein the background device 1 is configured to encrypt original key data so as to acquire key data to be burned and output the key data to be burned, wherein the terminal device 2 is provided with a microprocessor based on Trust Zone technology, the microprocessor has a physical core divided into a virtual secure core and a virtual normal core, and the microprocessor provides a trusted execution environment which provides a secure operating system based on the secure core, and a rich execution environment which provides a normal operating system based on the normal core, and the microprocessor switches between the secure operating system and the normal operating system based on monitor mode of the microprocessor.

After the terminal device 2 is enabled, the normal operating system is started, a client application acquires the key data to be burned and request the normal operating system to output the switching signal and the key data to be burned, the microprocessor receives the switching signal in a monitor mode and is switched to the secure operating system from the normal operating system, the secure operating system receives the key data to be burned and decrypts the data to be burned using preset key data, and if a decryption operation is successfully completed, the secure operating system will acquire the corresponding original key data and write the original key data into a secure storage area of the secure operating system, and will output a prompt message informing a user of a unsuccessful decryption if the decryption operation fails.

In the present embodiment, due to the use of the trusted execution environment-based key burning, the key is burned, stored and used safely. In addition, the cryptography protects the key from unexpected damage in transmission and keeps the key integral.

In one embodiment, the background device 1 can be a specific hardware security module or a general-purpose computer in which information security can be ensured, the background device including an encryption module 4, configured to encrypt the original key data so as to acquire the key data to be burned, and configured to output the key data to be burned.

In one embodiment, the normal operating system includes a client application module, configured to receive the key data to be burned, and configured to output the switching signal and the key data to be burned. In one embodiment, the hardware module includes a monitor mode module 5, configured to receive the switching signal and switch the microprocessor to the secure operating system.

In one embodiment, the secure operating system includes a trusted application module 7, configured to receive the key data to be burned and decrypt the key data to be burned using the preset key data, and configured to acquire the corresponding original key data and write the original key data into the secure storage area of the secure operating system if a decryption operation is successful, and output a prompt message informing a user of a unsuccessful decryption if the decryption operation fails.

In one embodiment, after the decryption operation is successfully completed, the trusted application module writes the original key data into the secure storage area by calling a file system interface of the secure operating system. In this embodiment, for a TEE-based burning, the original key data is encrypted at a terminal of the background device 1 so as to acquire the key data to be burned, that is, all the keys needs to be burned are encrypted. Then, all the encrypted keys are decrypted in the TA and are burned to the secure storage area (i.e., TEE data partition), such that keys 'security can be ensured. The key data of the terminal device 2 supplied to the factory is encrypted, through which key leakage can be effectively prevented in the factory.

In addition, since all the encrypted keys are decrypted in the TA, all the data is stored in a secure memory, and the data cannot be easily decoded. The keys are burned to the TEE data partition. The TEE data partition is generally isolated and is encrypted by a key unknown to the TEE end, which means that only a specified TA can access the TEE data partition, and that the outside world is not allowed to acquire the original data even if the outside world can access the TEE data partition. Furthermore, key information related to the key is still in the TEE data partition after some operations, such as a root operation.

Figure 2:
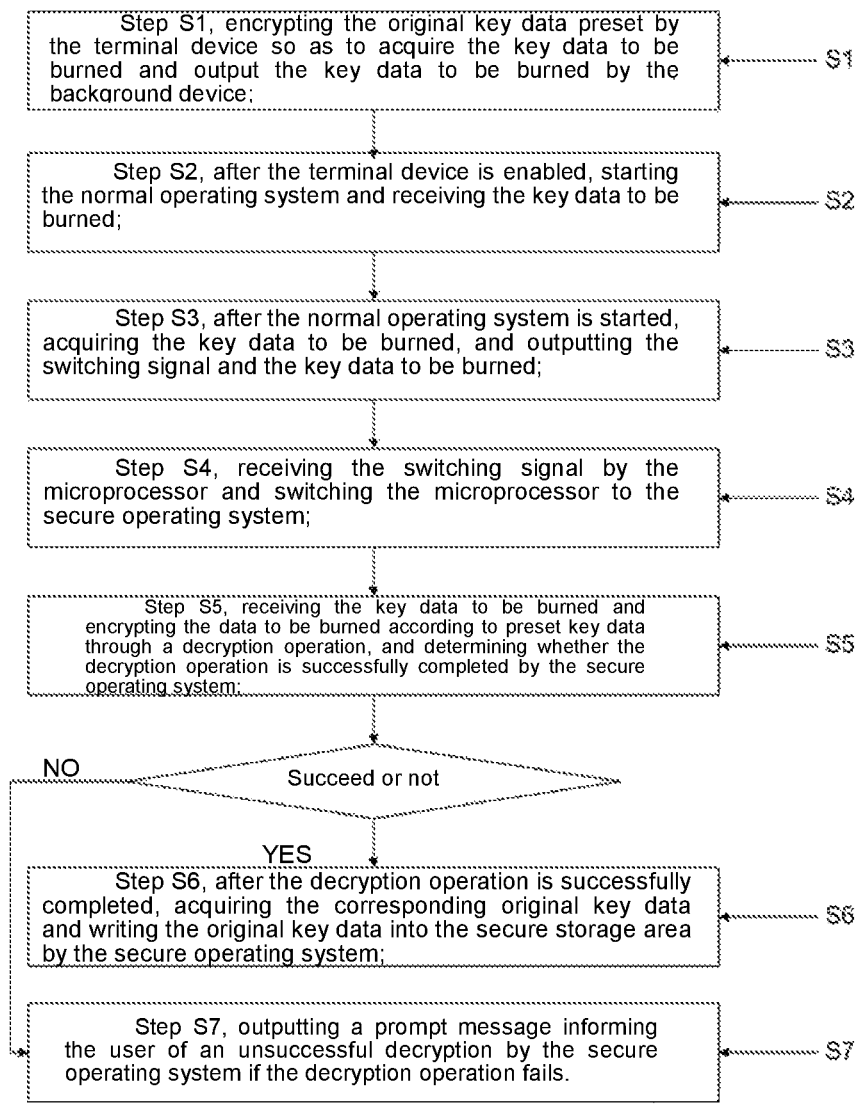
FIG. 2 is a flowchart of a trusted execution environment-based key burning method in a preferred embodiment of the present disclosure.

As shown in FIG. 2, a trusted execution environment-based key burning method adopting the above-mentioned trusted execution environment-based key burning system, includes Step S1, encrypting the original key data using the key data preset by the terminal device so as to acquire the key data to be burned and output the key data to be burned by the background device 1. The method includes Step S2, after the terminal device 2 is enabled, starting the normal operating system and receiving the key data to be burned. The method includes Step S3, after the normal operating system is started, acquiring the encrypted key data to be burned, and outputting the switching signal and the key data to be burned. The method includes Step S4, receiving the switching signal and starting the secure operating system by the microprocessor. The method includes Step S5, after the secure operating system is started, receiving the key data to be burned and decrypting the data to be burned according to preset key data through a decryption operation by the secure operating system, and determining whether the decryption operation is successfully completed;

If the result shows "YES", proceeding to Step S6; if the result shows "NO", proceeding to Step S7. Step S6 includes after the decryption operation is successfully completed, acquiring the corresponding original key data and writing the original key data into the secure storage area by the secure operating system Step S7 includes outputting a prompt message informing the user of an unsuccessful decryption if the decryption operation fails.

In one embodiment, in Step S3, the normal operating system receives the key data to be burned via the client application module 6, and outputs the switching signal and the key data to be burned. In one embodiment, in Step S4, the microprocessor receives the switching signal via the monitor mode module 5, and starts the monitor mode to switch to the secure operating system. In one embodiment, in Steps S5, S6 and S7, the secure operating system receives the key data to be burned via the trusted application module 7, and decrypts the key data to be burned according to the preset key data, and acquires the corresponding original key data after the decryption operation is successfully completed, and writes the original key data into the secure storage area of the secure operating system, and outputs a prompt message informing the user of an unsuccessful decryption if the decryption operation fails, and the secure operating system also outputs the failure information if the original key data is not written into the secure storage area.

In the present embodiment, the CA sends the key data to be burned (i.e., the encrypted key data) to the TA (the REE terminal can only access the encrypted data without access to the original data). The TA decrypts the key data using the preset key, and verifies the integrity of the data, and obtains the key original data (this step runs in the TEE environment, and all data cannot be accessed in the REE environment). The TA writes the encrypted data into the secure storage area by calling a file system interface of the secure operating system (this step is performed based on a certain security mechanism, and the REE cannot access the original data).

The above descriptions are only the preferred embodiments of the present embodiment, not thus limiting the embodiments and scope of the present embodiment. Those skilled in the art should be able to realize that the schemes obtained from the content of specification and drawings of the present disclosure are within the scope of the embodiment.

What is claimed is:
1. A key burning system, comprising:
a background device comprising a non-transitory memory, wherein the background device is configured to encrypt original key data so as to acquire key data to be burned and output the key data to be burned; and
a terminal device, wherein the terminal device comprises a microprocessor based on Trust Zone technology, the microprocessor has a physical core divided into a virtual secure core and a virtual normal core, and the microprocessor provides a trusted execution environment which provides a secure operating system based on the secure core, and a rich execution environment which provides a normal operating system based on the normal core, and the microprocessor switches between the secure operating system and the normal operating system based on monitor mode of the microprocessor,
wherein after the terminal device is enabled, the normal operating system is started, a client application preset by the terminal device receives the key data to be burned and sends a request to the normal operating system, the normal operating system outputs a switching signal and the key data to be burned, the microprocessor receives the switching signal in a monitor mode and is switched to the secure operating system from the normal operating system, the secure operating system receives the key data to be burned and decrypt the data to be burned according to preset key data, and if a decryption operation is successfully completed, the secure operating system will acquire the corresponding original key data and write the original key data into a secure storage area of the secure operating system, and will output a prompt message informing a user of a unsuccessful decryption if the decryption operation fails,
wherein the normal operating system comprises a client application module stored in the microprocessor to receive the key data to be burned, output the key data to be burned, and request the normal operating system to output the switching signal,
wherein the terminal device further comprises a monitor mode module stored in the microprocessor to receive the switching signal and switch the microprocessor to the secure operating system, and wherein the secure operating system comprises a trusted application module stored in the microprocessor to receive the key data to be burned and decrypt the key data to be burned using the preset key data, write the original key data into the secure storage area of the secure operating system if a decryption operation is successfully completed, and output a prompt message informing a user of a unsuccessful decryption if the decryption operation fails.

2. The key burning system as claimed in claim 1, wherein the background device comprises:

a storage module stored in the non-transitory memory to store the original key data, the key data preset by the terminal device and the key data to be burned and generated from the background device; and an encryption module stored in the non-transitory memory to encrypt the original key data using the key data preset by the terminal device so as to acquire the key data to be burned, and to output the key data to be burned.

3. The key burning system as claimed in claim 1, wherein after the decryption operation is successfully completed, the trusted application module stored in the microprocessor, writes the original key data into the secure storage area by calling a file system interface of the secure operating system.

4. A key burning method, comprising:

adopting a trusted execution environment-based key burning system, wherein the trusted execution environment-based key burning system comprises:

a background device comprising a non-transitory memory, wherein the background device is configured to encrypt original key data so as to acquire key data to be burned and output the key data to be burned; and a terminal device, wherein the terminal device comprises a microprocessor based on Trust Zone technology, the microprocessor has a physical core divided into a virtual secure core and a virtual normal core, and the microprocessor provides a trusted execution environment which provides a secure operating system based on the secure core, and a rich execution environment which provides a normal operating system based on the normal core, and the microprocessor switches between the secure operating system and the normal operating system based on monitor mode of the microprocessor, wherein after the terminal device is enabled, the normal operating system is started, a client application preset by the terminal device receives the key data to be burned and sends a request to the normal operating system, the normal operating system outputs a switching signal and the key data to be burned, the microprocessor receives the switching signal in a monitor mode and is switched to the secure operating system from the normal operating system, the secure operating system receives the key data to be burned and decrypt the data to be burned according to preset key data, and if a decryption operation is successfully completed, the secure operating system will acquire the corresponding original key data and write the original key data into a secure storage area of the secure operating system, and will output a prompt message informing a user of a unsuccessful decryption if the decryption operation fails;

wherein the normal operating system comprises a client application module stored in the microprocessor to receive the key data to be burned, output the key data to be burned, and request the normal operating system to output the switching signal, wherein the terminal device further comprises a monitor mode module stored in the microprocessor to receive the switching signal and switch the microprocessor to the secure operating system, and wherein the secure operating system comprises a trusted application module stored in the microprocessor to receive the key data to be burned and decrypt the key data to be burned using the preset key data, write the original key data into the secure storage area of the secure operating system if a decryption operation is successfully completed, and output a prompt message informing a user of a unsuccessful decryption if the decryption operation fails;

Step S1, encrypting the original key data using the key data preset by the terminal device so as to acquire the key data to be burned and output the key data to be burned by the background device;

Step S2, after the terminal device is enabled, starting the normal operating system and receiving the key data to be burned;

Step S3, after the normal operating system is started, acquiring the encrypted key data to be burned, and outputting the switching signal and the key data to be burned;

Step S4, receiving the switching signal by the microprocessor and switching the microprocessor to the secure operating system;

Step S5, receiving the key data to be burned and decrypting the data to be burned according to preset key data through a decryption operation by the secure operating system, and determining whether the decryption operation is successful;

if the result shows "YES", proceeding to Step S6;

if the result shows "NO", proceeding to Step S7;

Step S6, after the decryption operation is successfully completed, acquiring the corresponding original key data and writing the original key data into the secure storage area by the secure operating system; and Step S7, outputting a prompt message informing the user of an unsuccessful decryption by the secure operating system if the decryption operation fails.

5. The key burning method as claimed in claim 4, wherein in Step S3, the normal operating system receives the key data to be burned via the client application module stored in the microprocessor and outputs the switching signal and the key data to be burned.

6. The key burning method as claimed in claim 4, wherein in Step S4, the microprocessor receives the switching signal via the monitor mode module stored in the microprocessor and starts the monitor mode to switch to the secure operating system.

7. The key burning method as claimed in claim 4, wherein in Steps S5, S6 and S7, the secure operating system receives the key data to be burned via the trusted application module stored in the microprocessor, and decrypts the key data to be burned according to the preset key data, and acquires the corresponding original key data after the decryption operation is successfully completed, and writes the original key data into the secure storage area of the secure operating system, and outputs a prompt message informing the user of an unsuccessful decryption if the decryption operation fails.

8. The key burning method as claimed in claim 4, further comprising:
- storing in a storage module stored in the non-transitory memory of the background device, the original key data, the key data preset by the terminal device and the key data to be burned and generated from the background device; and
- encrypting using an encryption module stored in the non-transitory memory of the background device, the original key data using the key data preset by the terminal device so as to acquire the key data to be burned and output the key data to be burned.

9. The key burning method as claimed in claim 4, further comprising: after the decryption operation is successfully completed, using the trusted application module stored in the microprocessor to write the original key data into the secure storage area by calling a file system interface of the secure operating system.

\* \* \* \* \*